(12) United States Patent
Ayers et al.

(10) Patent No.: US 12,289,287 B2
(45) Date of Patent: Apr. 29, 2025

(54) SINGLE-DOMAIN REGISTRATION INITIATED CANCELLATION

(71) Applicant: Hewlett Packard Enterprise Development LP, Houston, TX (US)

(72) Inventors: John I. Ayers, Omaha, NE (US); Lee B. Valerius, Carrollton, TX (US); Carlos Alberto Galamba Galvao, Sobreda (PT); Bradley T. Kenyon, Omaha, NE (US); Mathew M. Kaippallimalil, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 274 days.

(21) Appl. No.: 17/945,881

(22) Filed: Sep. 15, 2022

(65) Prior Publication Data

US 2024/0098059 A1    Mar. 21, 2024

(51) Int. Cl.
| | |
|---|---|
| H04L 29/06 | (2006.01) |
| H04L 61/3015 | (2022.01) |
| H04W 8/20 | (2009.01) |
| H04W 88/18 | (2009.01) |

(52) U.S. Cl.
CPC ............ *H04L 61/302* (2013.01); *H04W 8/20* (2013.01); *H04W 88/184* (2013.01)

(58) Field of Classification Search
CPC ............... H04L 61/302; H04L 61/4588; H04L 63/0892; H04W 8/20; H04W 88/184; H04W 4/90; H04W 8/08; H04W 8/30; H04W 8/04; H04W 60/00; H04W 12/06; H04W 24/08

USPC .......................................................... 709/245
See application file for complete search history.

(56) References Cited

U.S. PATENT DOCUMENTS

| | | | |
|---|---|---|---|
| 10,306,580 B1* | 5/2019 | Gupta | H04W 8/02 |
| 11,240,775 B2* | 2/2022 | Liu | H04W 36/00222 |
| 2001/0031635 A1* | 10/2001 | Bharatia | H04W 12/08 |
| | | | 455/433 |
| 2011/0125807 A1* | 5/2011 | Bland | H04W 8/18 |
| | | | 707/E17.044 |
| 2011/0258300 A1* | 10/2011 | Hao | H04W 36/0005 |
| | | | 709/221 |

(Continued)

OTHER PUBLICATIONS

IMS single registration (Year: 2024).*
IMS Single Registration in Android (Year: 2022).*

*Primary Examiner* — Hamza N Algibhah
(74) *Attorney, Agent, or Firm* — Yao Legal Services, Inc.

(57) ABSTRACT

One aspect can provide a system and method for enforcing a single-domain registration of a user equipment (UE) roaming across different provider networks. During operation, the system can receive, at a subscriber-management entity (SME) from a first service node within a first provider's network, a location-update message associated with the UE. The system can identify a second service node within a second provider's network with which the UE has a previous registration and query a subscriber-information database to determine whether a single-domain-registration feature is enabled at the SME for the UE. In response to determining that the single-domain-registration feature is enabled, the system can send a location-cancellation message to the second service node to cause the second service node to cancel the previous registration of the UE and register the UE at the SME.

17 Claims, 7 Drawing Sheets

(56) References Cited

U.S. PATENT DOCUMENTS

| | | | |
|---|---|---|---|
| 2012/0275442 A1* | 11/2012 | Malets | H04W 4/16 |
| | | | 455/417 |
| 2013/0012159 A1* | 1/2013 | Lodeweyckx | H04W 8/183 |
| | | | 455/406 |
| 2015/0038116 A1* | 2/2015 | Lodeweyckx | H04W 8/18 |
| | | | 455/411 |
| 2015/0358806 A1* | 12/2015 | Salqvist | H04W 8/12 |
| | | | 455/433 |
| 2016/0227447 A1* | 8/2016 | Hu | H04W 36/00224 |
| 2018/0160292 A1* | 6/2018 | Chastain | H04W 60/00 |
| 2018/0295659 A1* | 10/2018 | Shan | H04W 4/24 |
| 2019/0230508 A1* | 7/2019 | Olsson | H04W 4/90 |
| 2021/0136658 A1* | 5/2021 | Rönneke | H04W 8/20 |
| 2024/0056790 A1* | 2/2024 | Ball | H04W 4/02 |
| 2024/0064504 A1* | 2/2024 | Ligeret | H04L 61/4511 |

* cited by examiner

SINGLE-DOMAIN REGISTRATION INITIATED CANCELLATION

BACKGROUND

Field

This disclosure is generally related to management of registrations of user equipment (UE) in mobile networks.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown but is to be accorded the widest scope consistent with the principles and features disclosed herein.

Following is a list of acronyms used in this disclosure:
3GPP: 3rd Generation Partnership Project;
AVP: Attribute—Value Pairs;
CL: Cancel Location;
CL ACK: Cancel Location Acknowledgment;
CLR: Cancel Location Request;
CLA: Cancel Location Answer;
GPRS: General Packet Radio Service;
HLR: Home Location Register;
HSS: Home Subscriber Server;
ISD: Insert Subscriber Data;
ISD ACK: Insert Subscriber Data Acknowledgment;
IDR: Insert Subscriber Data Request;
IDA: Insert Subscriber Data Answer;
IMSI: International Mobile Subscriber Identity;
LTE: Long-Term Evolution (LTE);
MAP: Mobile Application Part;
MIMM: Multiple IMSI Multiple MSISDN;
MME: Mobile Management Entity;
MSISDN: Mobile Subscriber ISDN Number (phone number);
SME: Subscriber Management Entity;
SGSN: Serving GPRS Service Node;
Gn/Gp SGSN: SGSN in a 2G/3G network;
S4-SGSN: SGSN in a 4G/LTE network;
UE: User Equipment;
UDM: Unified Database Management;
ULR: Update Location Request;
ULA: Update Location Answer;
UGL: Update GPRS Location;
UGL ACK: Update GPRS Location Acknowledgment;
Gr: Interface between a Gn/Gp SGSN and an HLR;
S6a: Interface between an MME and an HSS; and
S6d: Interface between an S4-SGSN and an HSS.

When users of mobile communication devices (e.g., mobile phones) travel across geographic boundaries (e.g., state borders or international borders), they may be outside the coverage area of their own service provider, and their devices may be connected to the network of a different service provider and rely on roaming services provided by the different service provider. As mobile communication technologies evolve, each provider may operate a mixture of different types of networks, such as third generation (3G) networks, fourth generation (4G) networks, fifth generation (5G) networks, etc. When a user travels from one geographic location to another location, the user's mobile device may first be connected to one type of network (e.g., a 4G network) of a first provider and then be connected to a different type of network (e.g., a 3G network) of a second provider. To access services provided by the 3G network, the user's mobile device needs to register with a Home Location Register (HLR) of the 3G network. On the other hand, to access services provided by the 4G network, the user's device needs to register with a Home Subscriber Server (HSS), and for the 5G network, the user's device needs to register with a Unified Database Management (UDM) system.

When a user device roams from one provider's network to another provider's network, it is possible that the user device may maintain active registrations at both networks (especially in the case where the user device registers with different networks using different International Mobile Subscriber Identities (IMSIs)), even though the user device may only receive service from one network due to the geographic limitation. Allowing the user device to maintain its registration with a network after the user device leaves the coverage area can be problematic. For example, network entities may attempt to forward traffic to a registered but disconnected or unreachable user device, resulting in the waste of bandwidth resources. Moreover, when the user device travels from its home provider's 4G network to another provider's 3G network, if the user device switches its IMSI and successfully registers with the 3G network, then the HSS of the home network may have inconsistent transient data (which may indicate the current network switch to which the UE is attached) for the UE as two different IMSIs will be considered active at the same time. The HSS of the home network may lose control of the active sessions.

In conventional settings, the HSS or HLR in the home provider's network may use standard-based functionalities (e.g., as defined in the 3rd Generation Partnership Project (3GPP) standard TS 29.272) to enforce the single-registration behavior at the HSS or HLR (i.e., to cancel a previous registration when a new registration is received). For example, 3GPP TS 29.272 defines a "Single-Registration- Indicator" flag and an "Initial-Attach-Indicator" flag. An incoming registration request (e.g., a location-update request) can have either or both flag(s) set to cause the HSS in the home network to send out a location-cancellation message (e.g., a Cancel Location Request (CLR)) to the Serving GPRS (General Packet Radio Service) Service Node (SGSN) to cancel a previous SGSN registration. To use this feature, the SGSN to which the user device is to be registered or attached (i.e., the SGSN in the roaming network) needs to be armed with the initial-attachment feature (i.e., the SGSN can set the "Initial-Attach-Indicator" flag in the message sent from the SGSN in the roaming network to the HSS or HLR in the home network). If the incoming registration request is from a Mobile Management Entity (MME), the MME may need to be armed with either the single-registration feature or the initial-attachment feature in order to set a corresponding flag. However, the SGSN or MME in the roaming network is out of the control of the provider of the user device and cannot be guaranteed to have the single-registration or initial-attachment feature enabled. Consequently, the provider may not be able to take advantage of this standard-based feature to enforce single registration of subscribers. It is desirable to have a mechanism that can extend the single-registration feature across different domains (e.g., when the user device roams) such that a registration of a user device initiated from a roaming network using one IMSI can cause all previous registrations of the user device using different IMSIs to be cancelled. This new cross-domain single-registration feature can be referred to as single-domain registration and can be applied to all subscribed user devices or a subset of subscribed devices, depending on the implementation.

Figure 1:
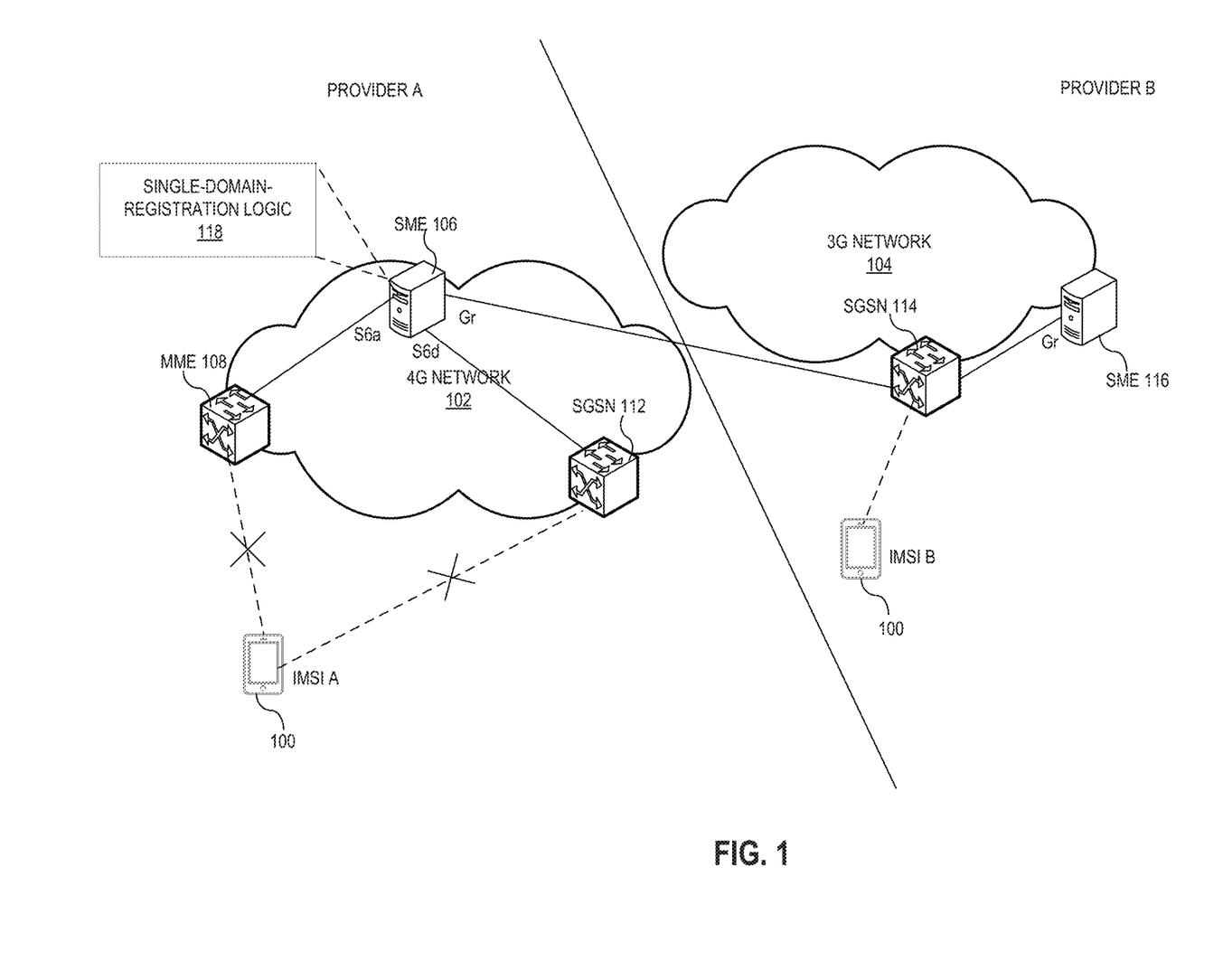
FIG. 1 illustrates an exemplary user equipment (UE)-registration scenario, according to one aspect of the application.

FIG. 1 illustrates an exemplary user equipment (UE)-registration scenario, according to one aspect. FIG. 1 shows a scenario in which a UE (e.g., a mobile phone) 100 roams from the network of one provider (e.g., provider A) to the network of a different provider (e.g., provider B). Provider B has a roaming agreement with provider A to allow subscribers of provider A to connect to the network of provider B when they travel outside of the coverage area of provider A's network. In FIG. 1, provider A's network (which can be referred to as the home network for UE 100) can include a 4G or Long-Term Evolution (LTE) network 102, and provider B's network (which can be referred to as the roaming network for UE 100) can include a 3G network 104. Note that some providers may only allow roaming devices to access their 2G or 3G networks. FIG. 1 shows that each network can include a subscriber-management entity (SME) for managing subscriber-related information (i.e., information associated with each UE, including IMSIs assigned to each UE, current location, and billing information of each UE, etc.).

4G network 102 can include an SME 106, a Mobile Management Entity (MME) 108, and an SGSN 112. SME 106 can include a central database that includes information about subscribers of provider A. In this example, SME 106 can include an HSS for interfacing with service nodes (e.g., nodes 108 and 112) in 4G network 102 and an HLR for interfacing with service nodes (e.g., node 114) in 3G network 104. Alternatively, the HSS and HLR can each be a standalone entity residing on different servers. MME 108 can be responsible for keeping track of the UEs registered to 4G network 102. The interface between MME 108 and the HSS within SME 106 is referred to as an S6a interface. SGSN 112 can be an S4-SGSN that supports handovers from 2G/3G networks to 4G networks. SGSN 112 can also be responsible for managing/updating the locations of the UEs.

When UE 100 is in the coverage area of 4G network 102, UE 100 can be attached to MME 108 (meaning UE 100 receives service via MME 108), which can send a location-update request to the HSS within SME 106 via the S6a interface to register UE 100 at the HSS in SME 106. The registration of UE 100 via the S6a interface can be referred to as an S6a registration. UE 100 can be similarly attached to SGSN 112 and registered at the HSS within SME 106 via the S6d interface between SGSN 112 and the HSS. The registration of UE 100 via the S6d interface can be referred to as an S6d registration. UE 100 can be subscribed to multiple-IMSI-multiple-MSISDN (MIMM) service, meaning that multiple IMSIs and MSISDNs (i.e., phone numbers) can be assigned to UE 100. In this example, UE 100 uses IMSI A when being attached to MME 108 and/or SGSN 112.

When the user travels from the coverage area of provider A to the coverage area of provider B (e.g., the user may travel across the border between two countries), UE 100 may be connected to 3G network 104 using a different IMSI (e.g., IMSI B). 3G network 104 can include an SGSN 114 and an SME 116. SGSN 114 can be a Gn/Gp SGSN, and SME 116 can include an HLR for managing information of subscribers in 3G network 104. The interface between SGSN 114 and the HLR in SME 116 is referred to as a Gr interface. In response to determining that UE 100 is roaming in 3G network 104 and that the home network of UE 100 is 4G network 102, SGSN 114 can send a location-update request (which can include IMSI B of UE 100) to the home HLR (i.e., the HLR in SME 106), which is located within the home network of UE 100. The location-update request can be sent to SME 106 via the Gr interface between SGSN 114 and the HLR in SME 106. The registration of UE 100 via the Gr interface can be referred to as a Gr registration.

In traditional settings, SGSN 114 is in 3G network 104 of provider B, and provider A has no control over the features enabled on SGSN 114. In other words, the location-update request originating from SGSN 114 may not carry the "Initial-Attach-Indicator" flags. This means that the HLR in SME 106 will not be triggered to send a notification to the service node (e.g., MME 108) in 4G network 102 to cancel a previous S6a registration of UE 100. Note that the S6d registration (or the attachment to SGSN 112) has been automatically cancelled when UE 100 is attached to SGSN 114, because the 3GPP standard specifies that a UE can only be attached to one SGSN at any given time. UE 100 may still be simultaneously registered with MME 108 using one IMSI (e.g., IMSI A) and with SGSN 114 using another IMSI (IMSI B). This can be problematic in certain situations. For example, SME 106 may have inconsistent transient data for UE 100, or the pre-existing S6a registration of UE 100 at MME 108 may interfere with the attachment of UE 100 to SGSN 114.

According to some aspects, SME 106 can include a single-domain-registration logic 118, which can be configured to cancel all previous registrations of a UE after receiving a new registration of the UE, even in situations where the previous registrations of the UE and the new registration use different IMSIs. In the example shown in FIG. 1, in the 3G domain, the signaling or messaging among the nodes (e.g., the SGSN and the HLR) in 3G network 104 can comply with the Mobile Application Part (MAP) protocol. More specifically, upon determining that UE 100 is roaming and there is a roaming agreement between provider A and provider B, SGSN 114 can send, via the Gr interface, a MAP update-GPRS-location (UGL) message to SME 106. The UGL message can specify the IMSI (e.g., IMSI B) of UE 100. SME 106 receives the UGL message and queries its subscriber-information database for information associated with UE 100. For example, SME 106 can identify other IMSIs (e.g., IMSI A) associated with UE 100 and can determine that UE 100 has been previously registered, using IMSI A, to the HSS in SME 106 via the S6a interface. In other words, SME 106 can determine that UE 100 has a previous attachment to or registration with MME 108. To enforce the single-domain registration, single-domain-registration logic 118 can send a location-cancellation message to MME 108 to cancel the previous S6a registration. According to some aspects, single-domain-registration logic 118 can use standard-based messages (e.g., messages defined by existing protocols) to send cancellation messages to nodes in the network to cancel the previous registrations of UE 100. For example, single-domain-registration logic 118 can send a Cancel Location Request (CLR) message according to the Diameter protocol to MME 108 to terminate the S6a registration of UE 100. The CLR message can have a cancellation-type Attribute—Value Pairs (AVP) value of "MME_UPDATE_PROCEDURE (0)." Other cancellation-type AVP values are also possible, depending on the implementation and the preference of the provider. Some providers may wish to specify the cancellation-type AVP value to be sent to MME 108 as "INITIAL_ATTACH_PROCEDURE (4)" or "SUBSCRIPTION_WITHDRAWAL (2)." All these different cancellation types are defined in the 3GPP standard.

FIG. 1 shows that subsequent to the cancellation of the S6d and S6a registrations, UE 100 has only one active attachment/registration (i.e., the Gr registration through SGSN 114). Note that the attachment of UE 100 to SGSN 112 is cancelled according to the 3GPP standard, whereas the attachment of UE 100 to MME 108 is cancelled by single-domain-registration logic 118 included in SME 106. In the example shown in FIG. 1, operations of single-domain-registration logic 118 can be triggered by SME 106 receiving an incoming registration on its Gr interface for UE 100. In addition to the above Gr-interface-triggered cancellation, other types of cancellation can also be possible. For example, an incoming registration at the S6a interface may also cancel a pre-existing Gr registration (e.g., by sending a MAP cancel-location (CL) message to the serving Gn/Gp SGSN) or S6d registration (e.g., by sending a Diameter CLR message to the serving S4-SGSN). Moreover, an incoming S6d registration may also cancel a pre-existing S6a registration (e.g., by sending a Diameter CLR message to the serving MME). In general, the SME can be configured in such a way that an incoming registration of a UE on a particular interface can cancel all previous registrations of the UE on other interfaces.

Figure 2:
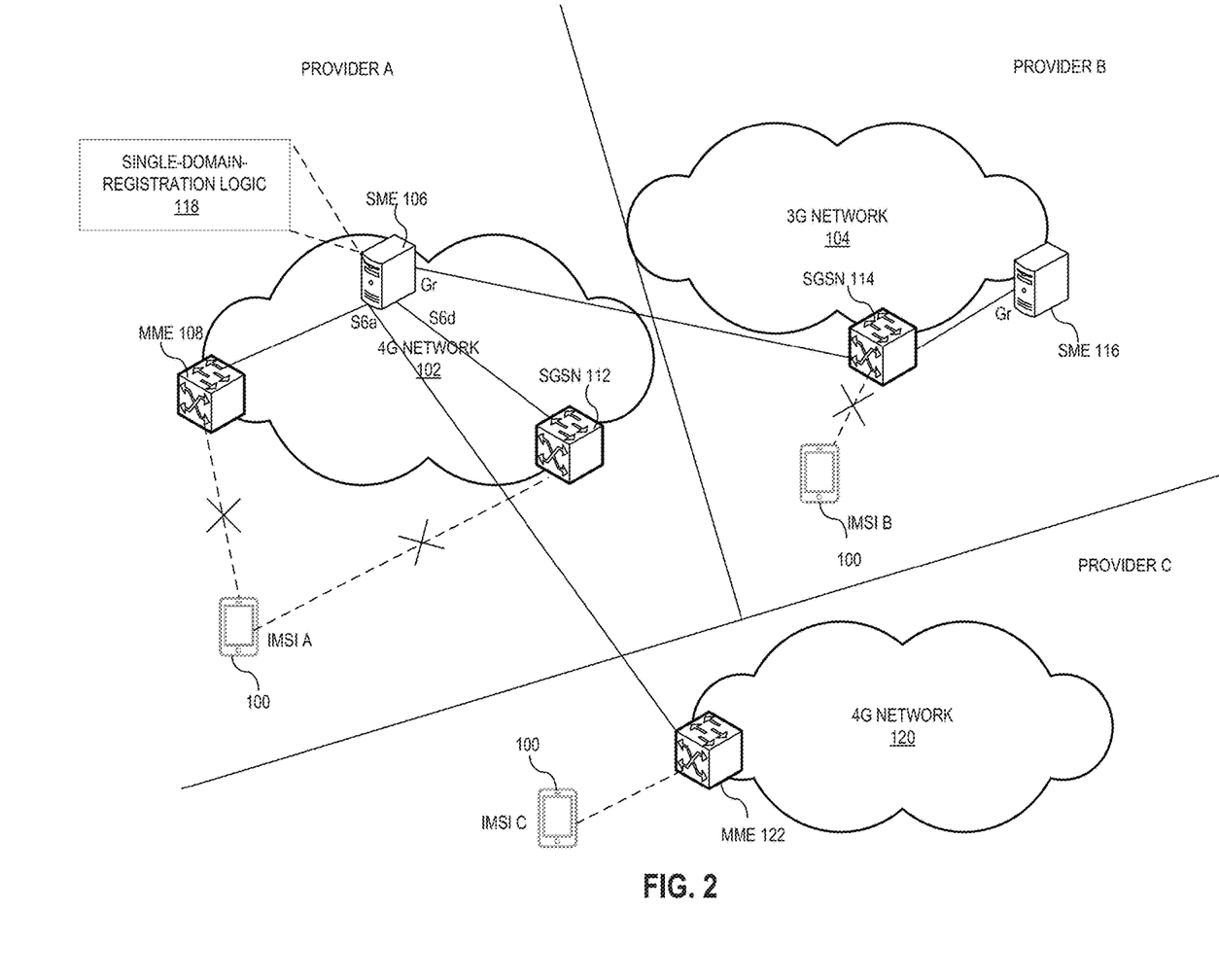
FIG. 2 illustrates an additional exemplary UE-registration scenario, according to one aspect of the application.

FIG. 2 illustrates an additional exemplary UE-registration scenario, according to one aspect. In FIG. 2, UE 100 may travel from the coverage area of 3G network 104 of provider B to the coverage area of 4G network 120 of provider C. More specifically, UE 100 can initialize an attachment to MME 122 within 4G network 120 using a new IMSI (e.g., IMSI C). Note that 4G network 120 may also include an SGSN and an SME, which are not shown in FIG. 2. In response to receiving the attachment request based on IMSI C, MME 122 can determine that UE 100 is a visiting or roaming device, and the home network of UE 100 is 4G network 102. Accordingly, MME 122 can send a Diameter update-location-request (ULR) message to SME 106 within 4G network 102 via the S6a interface between SME 106 and MME 122. The ULR message can include IMSI C and can cause the HSS of SME 106 to query the subscriber-information database to identify other IMSIs associated with UE 100. The query returns IMSI A and IMSI B and indicates that IMSI B has an active Gr registration with SGSN 114. If single-domain-registration logic 118 is enabled on SME 106, single-domain-registration logic 118 can send, via the Gr interface, a MAP CL message to SGSN 114 (which is a Gn/Gp SGSN) to cancel the Gr registration of UE 100.

Figure 3:
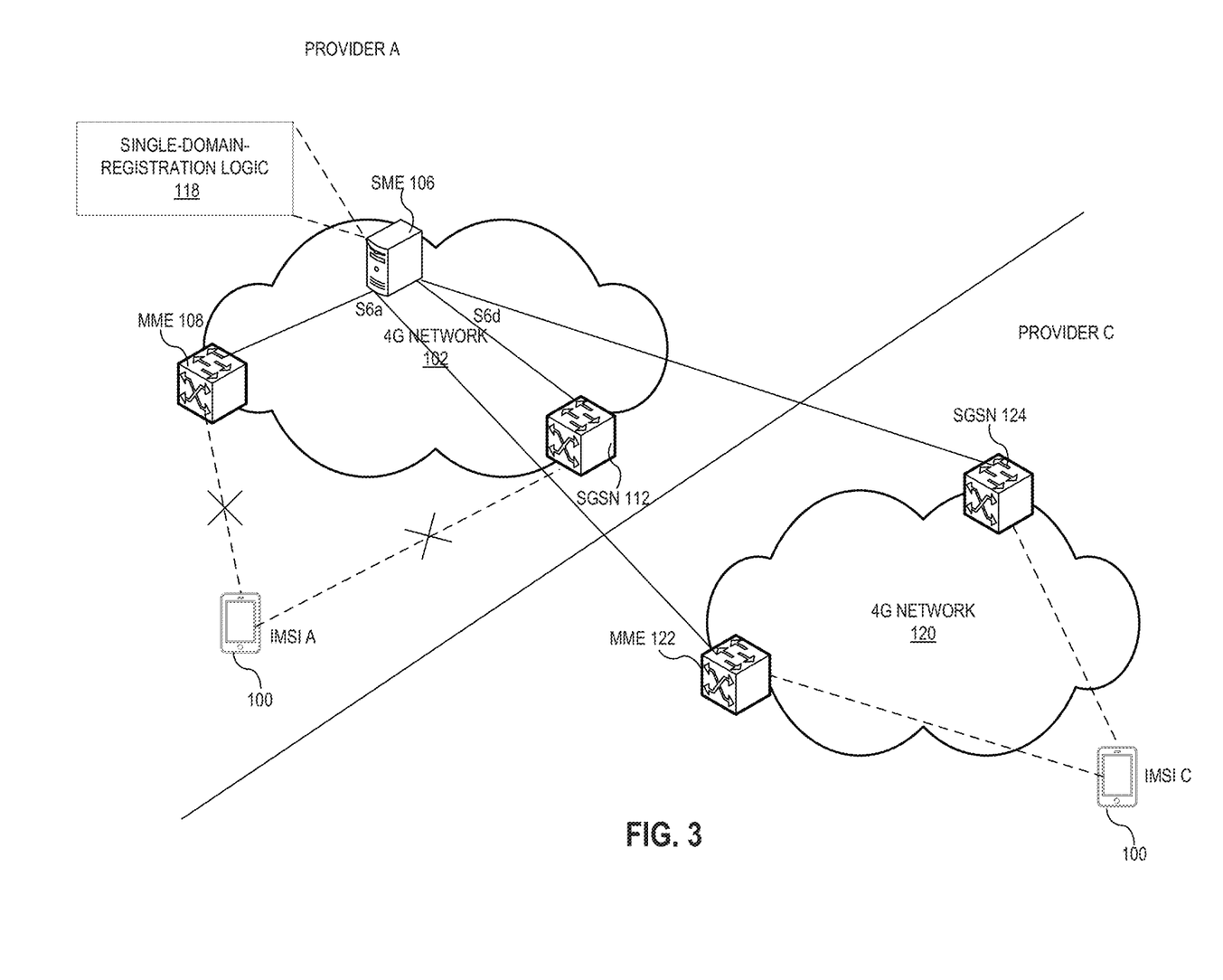
FIG. 3 illustrates another exemplary UE-registration scenario, according to one aspect of the application.

FIG. 3 illustrates another exemplary UE-registration scenario, according to one aspect. In the example shown in FIG. 3, UE 100 may travel directly from provider A's coverage area to provider C's coverage area and initialize an attachment to MME 122 within 4G network 120 using IMSI C. To complete the attachment, MME 122 can send a ULR message containing IMSI C to SME 106 within 4G network 102. SME 106 can query the subscriber-information database to determine that UE 100 is also associated with IMSI A, which has an active S6d registration with SGSN 112. SME 106 can determine whether the single-domain-registration feature is enabled (or if single-domain-registration logic 118 is activated). If so, single-domain-registration logic 118 can send a Diameter CLR message to SGSN 112 to cancel the previous S6d registration. Moreover, if IMSI A of UE 100 also has an active S6a registration with MME 108, single-domain-registration logic 118 can send a Diameter CLR message to MME 108 to cancel this S6a registration. In other words, the incoming S6a registration can cause the cancellation of pre-existing S6d and/or S6a registrations.

FIG. 3 also shows that UE 100 may initialize an attachment to SGSN 124 (which can be an S4-SGSN) within 4G network 120 using IMSI C. According to the 3GPP standard, a UE can only be attached to or registered with a single SGSN at any given time. Hence, the attachment to SGSN 124 can automatically cause the cancellation of the S6d registration of UE 100 at SGSN 112. In addition, SGSN 124 can send a ULR message containing IMSI C to SME 106 within 4G network 102, causing the HSS within SME 106 to query the subscriber-information database to determine that UE 100 is also associated with IMSI A, which has an active S6a registration with MME 108. If activated, single-domain-registration logic 118 can send a Diameter CLR message to MME 108 to cancel the previous S6a registration. The incoming S6d registration of UE 100 can then successfully cause the cancellation of the pre-existing S6a and/or S6d registrations.

Figure 4:
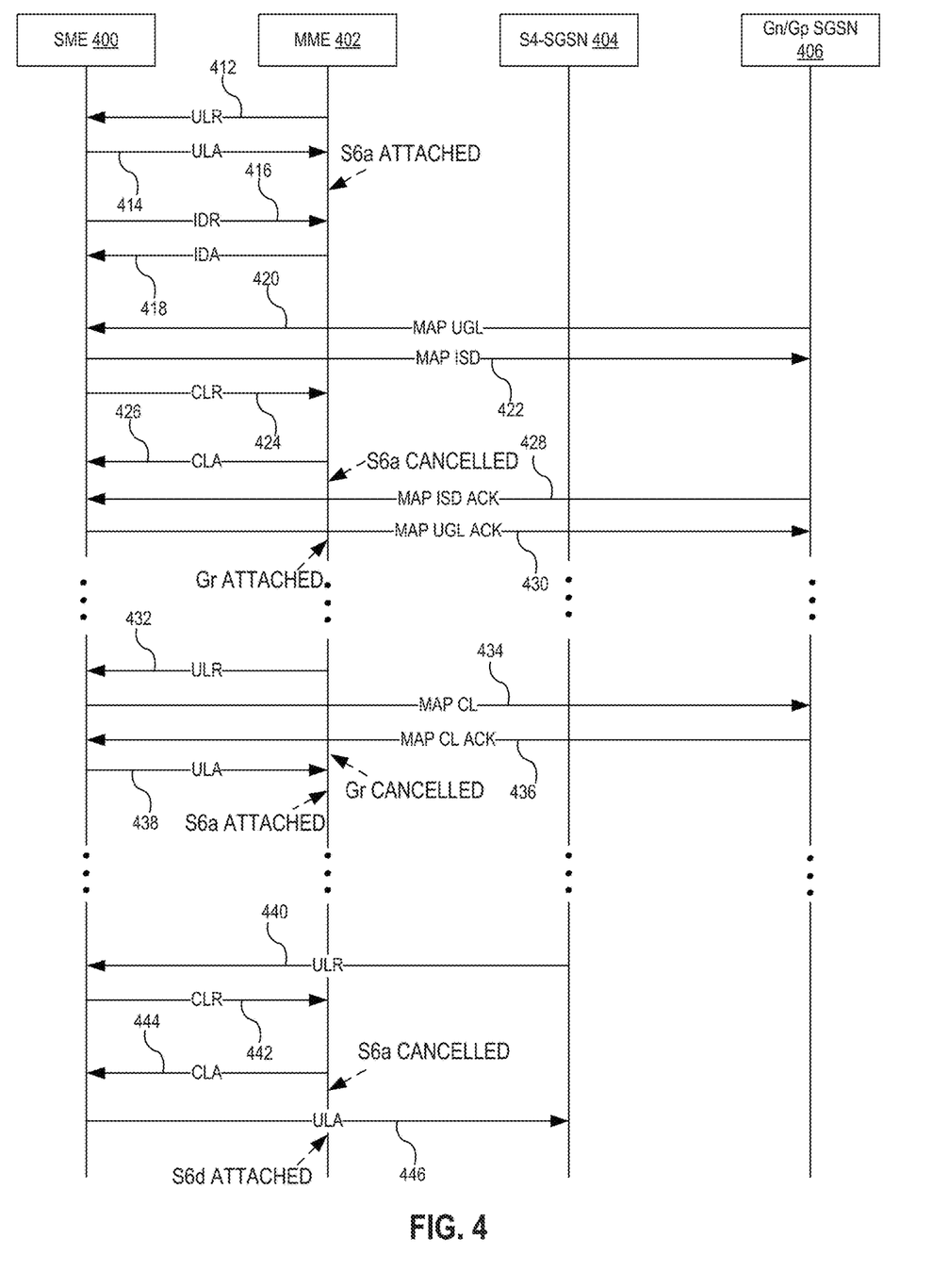
FIG. 4 illustrates messages exchanged between a subscriber-management entity (SME) and a number of service nodes in the mobile network, according to one aspect of the application.

FIG. 4 illustrates messages exchanged between the subscriber-management entity (SME) and a number of service nodes in the mobile network, according to one aspect. In this example, an SME 400 exchanges messages with a number of service nodes, including an MME 402, an S4-SGSN 404, and a Gn/Gp SGSN 406. MME 402 and S4-SGSN 404 are nodes in a 4G network, and Gn/Gp SGSN 406 is a node in a 3G network. These nodes can be in the home network of a UE or a roaming network of the UE.

MME 402 can send an Update Location Request (ULR) message 412 on behalf of a UE to SME 400. The HSS in SME 400 responds to ULR message 412 using an Update Location Answer (ULA) message 414 to indicate that the UE is successfully attached to MME 402 (or the UE has an active S6a registration). SME 400 can subsequently send an Insert Subscriber Data Request (IDR) message 416 to MME 402 and receive an Insert Subscriber Data Answer (IDA) message 418. At this time, the UE is attached to MME 402 and its location information is updated at SME 400.

At a later time, the UE attempts to register with or attach to Gn/Gp SGSN 406, which sends, on behalf of the UE, a MAP UGL message 420 to the HLR in SME 400. UGL message 420 can include the IMSI used by the UE for registering for services. This IMSI may be the same as or different from the IMSI used by the UE for the previous S6a registration. UGL message 420 can also include additional information, such as the MSISDN (or phone number), the IP address of Gn/Gp SGSN 406, the capability of Gn/Gp SGSN 406, etc. In response to receiving MAP UGL message 420, SME 400 can determine that there is an incoming Gr registration for the UE (even when a different IMSI is used) and that the previous S6a registration needs to be cancelled.

SME 400 can send an MAP Insert Subscriber Data (ISD) message 422 to Gn/Gp SGSN 406 and send a CLR message 424 to MME 402. CLR message 424 can specify the cancellation type as the MME_UPDATE_PROCEDURE (0). Other cancellation types can also be possible. MME 402 can cancel the S6a registration of the UE and respond to CLR message 424 by sending a Cancel Location Answer (CLA) message 426. Gn/Gp SGSN 406 responds to MAP ISD message 422 with a MAP ISD ACK message 428, and SME 400 responds to MAP UGL message 420 by sending a UGL acknowledgment (ACK) message 430. At this point, the UE is successfully attached to Gn/Gp SGSN 406 with its location information updated at SME 400.

At a later time, the UE may travel to a different geographic location and attempt to register for service at MME 402, which can send a ULR message 432 to SME 400 via the S6a interface. Note that ULR message 432 may carry a number of flags. In one example, ULR message 432 can carry the "Single-Registration-Indicator" or "Initial-Attach-Indicator" flag, which can trigger the standard-based single-registration behavior of the HSS in SME 400 (meaning that SME 400 would cancel other registrations associated with the UE). However, it is also possible that those flags are not included in ULR 432, because MME 402 is not armed with such a feature. In this situation, if the single-domain-registration feature has been enabled on SME 400 for that UE, SME 400 can enforce non-standard-based single-domain registration by canceling the pre-existing registration (in this case, the Gr registration). More specifically, the HLR in SME 400 can send out a MAP CL message 434 to Gn/Gp SGSN 406, which responds with a CL ACK message 436. SME 400 responds to ULR message 432 using a ULA message 438. At this point, the UE is successfully registered with or attached to MME 402.

The UE can register for service at S4-SGSN 404, which can send a ULR message 440 to SME 400 via an S6d interface. ULR message 440 may carry the "Initial-Attach-Indicator" flag to trigger the standard-based single-registration behavior of the HSS in SME 400 (meaning that the HSS would cancel other registrations associated with the UE). However, it is also possible that this flag is not included in ULR message 440, because S4-SGSN 404 belongs to a roaming network and is not armed with such a feature. In this situation, if the single-domain-registration feature has been enabled on SME 400 for that UE, SME 400 can cancel the pre-existing registration (in this case, the S6a registration at MME 402). More specifically, SME 400 can send a CLR message 442 to MME 402, cancelling the S6a registration. MME 402 responds to CLR message 442 to MME 402 by sending a CLA message 444 to SME 400. SME 400 responds to ULR message 440 by sending a ULA message 446 to S4-SGSN 404. At this point, the UE is successfully registered with or attached to S4-SGSN 404 via the S6d interface.

Figure 5:
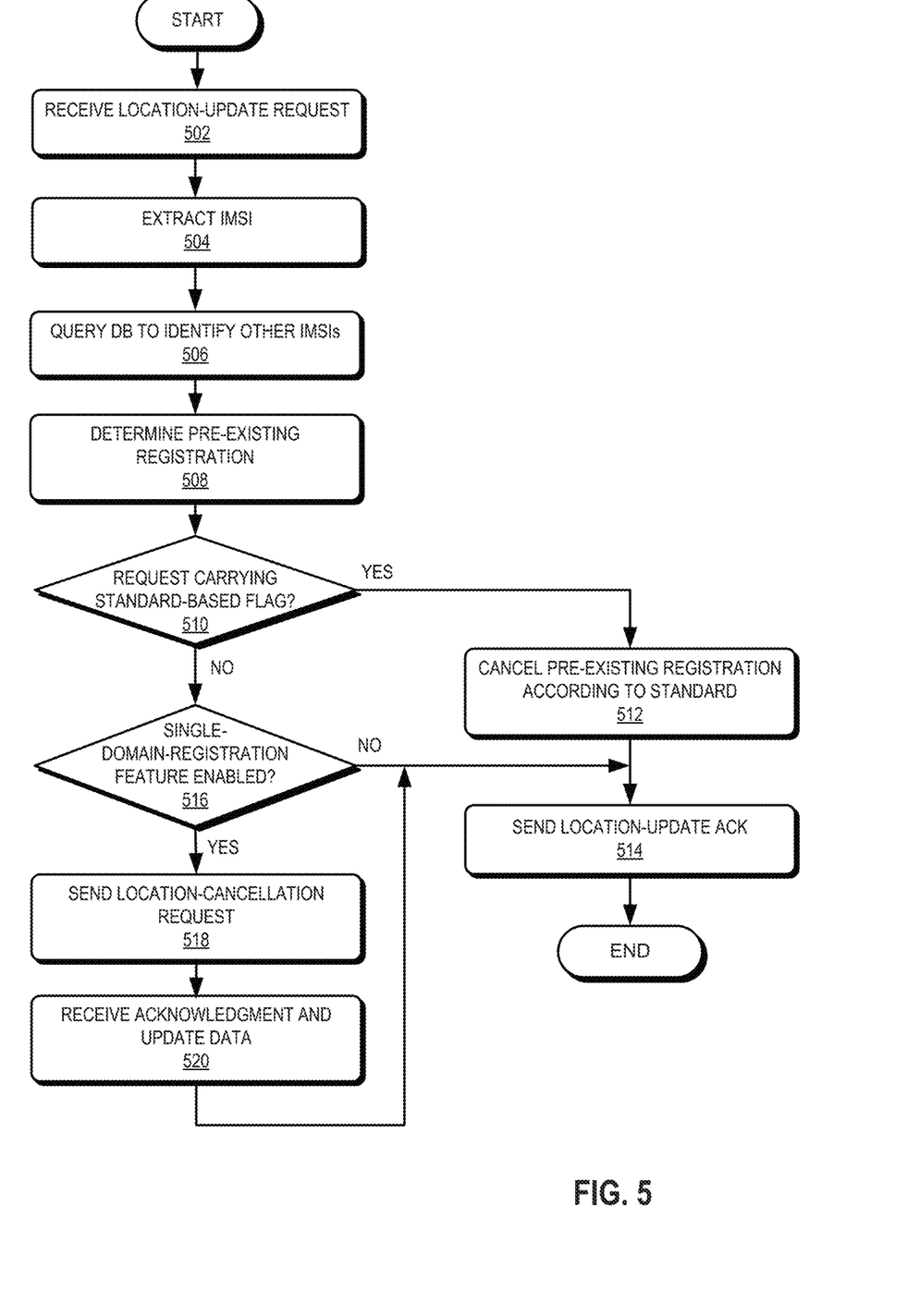
FIG. 5 presents a flowchart illustrating an exemplary process for facilitating the single-domain registration, according to one aspect of the application.

FIG. 5 presents a flowchart illustrating an exemplary process for facilitating the single-domain registration, according to one aspect. During operation, an SME within a provider's network can receive, from a network node outside of the provider's network via a corresponding interface, a location-update request to update the location of a UE (operation 502). More specifically, the network node may belong to a different provider's network, which has a roaming agreement with the provider. In one example, the provider's network can be a 4G/LTE network, the different provider's network can be a 2G or 3G network, and the network node can be a Gn/Gp SGSN. The interface corresponding to the Gn/Gp SGSN can be a Gr interface. The UE can register for service at the Gn/Gp SGSN. The location-update request can be a MAP UGL message and can be sent to the SME from the Gn/Gp SGSN via the Gr interface. The location-update request can specify the IMSI used by the UE for the Gr registration.

In response to receiving the location-update request, the SME can extract the IMSI included in the request (operation 504) and query a subscriber-information database attached to or included in the SME to identify other IMSIs associated with the UE (operation 506). When roaming, the UE may register for service using a Multiple IMSI Multiple MSISDN (MIMM) IMSI, which can be different from the IMSI used by the UE within the coverage area of its provider.

The SME can determine, based on the identified IMSIs, a pre-existing registration of the UE at a different network node (operation 508). The different network node can be within the home network or a roaming network. In one example, this different network node can be an MME in a 4G network. The MME communicates with the SME via an S6a interface. The UE may have used a different IMSI to register for service at the MME.

The SME can further determine whether the location-update request carries a standard-based (e.g., based on the 3GPP standard) "Single-Registration-Indicator" or "Initial-Attach-Indicator" flag (operation 510). If so, the SME can cancel the pre-existing registration of the UE according to the standard (operation 512) and send a location-update acknowledgment to the node to complete the registration of the UE (operation 514). If not, the SME can determine whether the single-domain-registration feature has been enabled for the UE (operation 516). Note that the single-domain-registration feature can be a system-wide attribute that is applied to all subscribers or can be a subscription choice and be applied to a subset of subscribers. The SME can query the subscriber-information database to determine whether the single-domain-registration feature has been enabled for the UE. If the single-domain-registration feature is enabled for the UE, the SME can send a location-cancellation request to the different network node (operation 518). If the different network node is an MME, the SME can send a Diameter CLR message to the MME to cancel the registration of the UE at the MME using a cancellation type "MME_UPDATE_PROCEDURE (0)." Other cancellation types are also possible, as defined by the 3GPP standard. The SME can subsequently receive an acknowledgment for the location-cancellation request, indicating that the different network node has cancelled the registration of the UE, and update the subscription data in the subscriber-information database (operation 520). The SME can send a location-update acknowledgment to the node to complete the registration of the UE (operation 514). If the single-domain registration feature is not enabled for the UE, the SME sends the location-update acknowledgment to the node (operation 514), without cancelling the previous registration.

Figure 6:
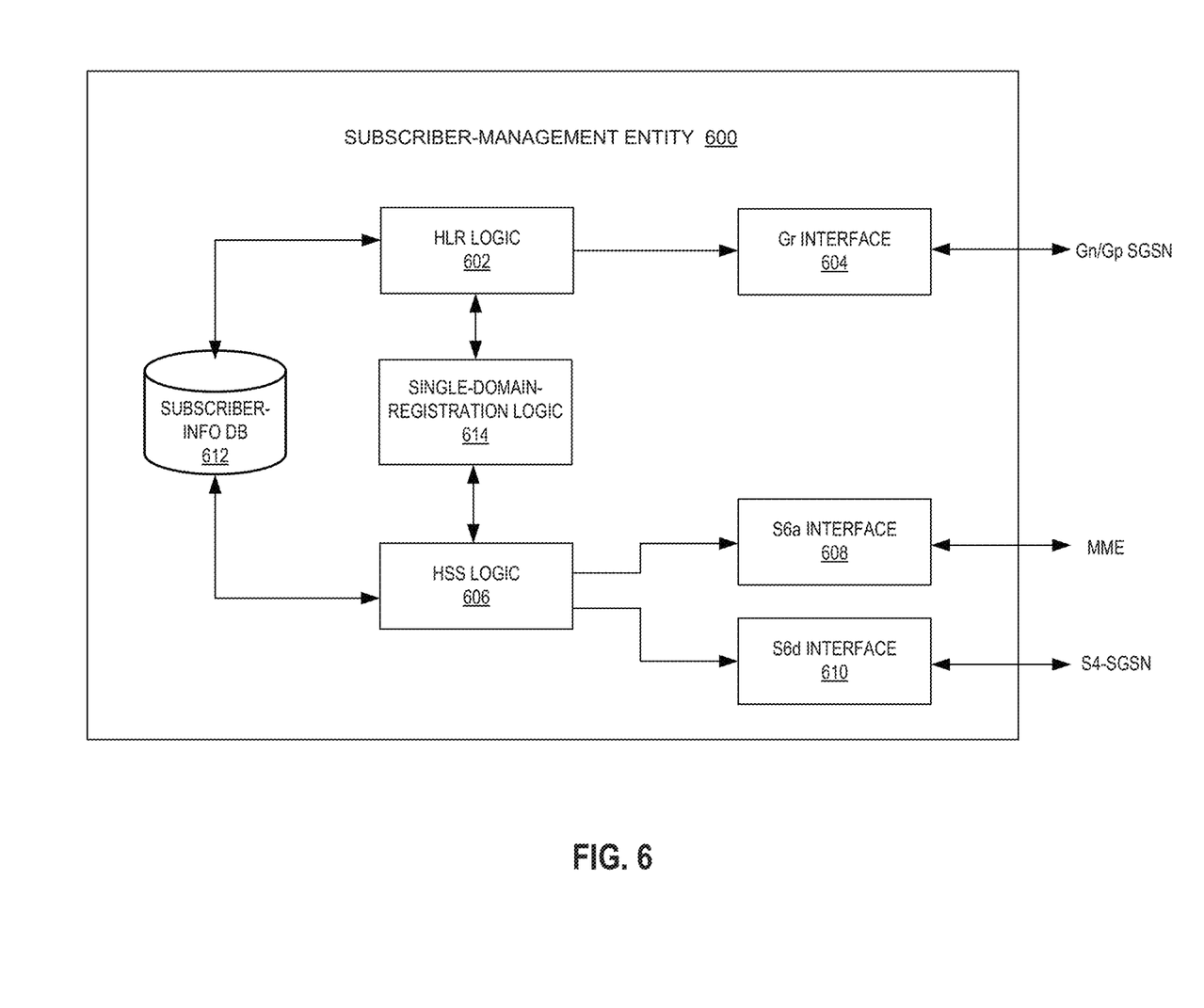
FIG. 6 illustrates an exemplary architecture of a subscriber-management entity (SME), according to one aspect of the application.

FIG. 6 illustrates an exemplary architecture of a subscriber-management entity (SME), according to some aspects. SME 600 can include an HLR logic 602, a Gr interface 604, an HSS logic 606, an S6a interface 608, an S6d interface 610, a subscriber-information database 612, and a single-domain-registration logic 614. These various functional blocks in SME 600 can be implemented using hardware or software logic, or both.

HLR logic 602 can be responsible for performing functionalities of a Home Location Register, such as managing information associated with subscribers. Gr interface 604 allows HLR logic 602 to communicate with the Gn/Gp SGSN in a 2G/3G network. HSS logic 606 can be responsible for performing functionalities of a Home Subscriber Server. S6a interface 608 allows HSS logic 606 to communicate with the MME in a 4G/LTE network, and S6d interface 610 allows HSS logic 606 to communicate with the S4-SGSN in the 4G/LTE network. Subscriber-information database 612 stores user-related and subscription-related information, such as account information, account status, user preference, features subscribed to by the user, user's current location, etc. According to some aspects, the ability to turn off or disable the single-domain-registration feature can be presented to the users as a subscription choice. The default behavior of the network is to enforce single-domain registration for all users. A user can turn off this feature through subscription. With the single-domain-registration feature turned off for a UE, the UE may have multiple active registrations associated with multiple IMSIs. For example, the UE may have an S6a registration using one IMSI in a 4G network and have a Gr registration using another IMSI in a 3G network. HLR logic 602 and HSS logic 606 both query subscriber-information database 612 to obtain information associated with the subscriber, such as whether the single-domain-registration feature is turned on or off for a particular subscriber.

Single-domain-registration logic 614 can be responsible for enforcing single-domain registration, such that at any given time a UE can only have one IMSI with an active registration. Any incoming registration of a UE on any interface of the SME 600 will cancel all previous registrations for the UE on any other interface of the SME 600 regardless of whether the incoming and previous registrations use the same IMSI or different IMSIs. More specifically, single-domain-registration logic 614 can process the location-update requests received by HLR logic 602 (via Gr interface 604) and HSS logic 606 (via S6a interface 608 or S6d interface 610) and query subscriber-information database 612 to extract identity information of the subscribers and determine whether the single-domain-registration feature is turned on for the subscribers. If the single-domain-registration feature is turned on for a particular subscriber (i.e., a particular UE), single-domain-registration logic 614 can identify one or more previous registrations of the UE, including registrations using the same IMSI or different IMSIs as the incoming registration. Single-domain-registration logic 614 can then generate appropriate location-cancellation messages and send the location-cancellation messages to corresponding nodes to which the UE was previously attached in order to cancel the previous registration/attachment of the UE. For example, single-domain-registration logic 614 can determine whether the previous registration is an S6a/S6d or Gr registration. If the previous registration is an S6a/S6d registration, single-domain-registration logic 614 can generate a Diameter CLR message and send the message to the node (which can be an MME or an S4-SGSN) corresponding to the previous S6a/S6d registration to cancel the previous registration/attachment to the node. Depending on the implementation (which can be based on the provider's preference), the cancellation-type AVP value can be "MME_UPDATE_PROCEDURE (0)," "INITIAL_ATTACH_PROCEDURE (4)," or "SUBSCRIP- TION_WITHDRAWAL (2)." If the previous registration is a Gr registration, single-domain-registration logic 614 can generate a MAP CL message and send the CL message to the node (which can be a Gn/Gp SGSN) corresponding to the previous Gr registration to cancel the previous registration/attachment to the node.

Figure 7:
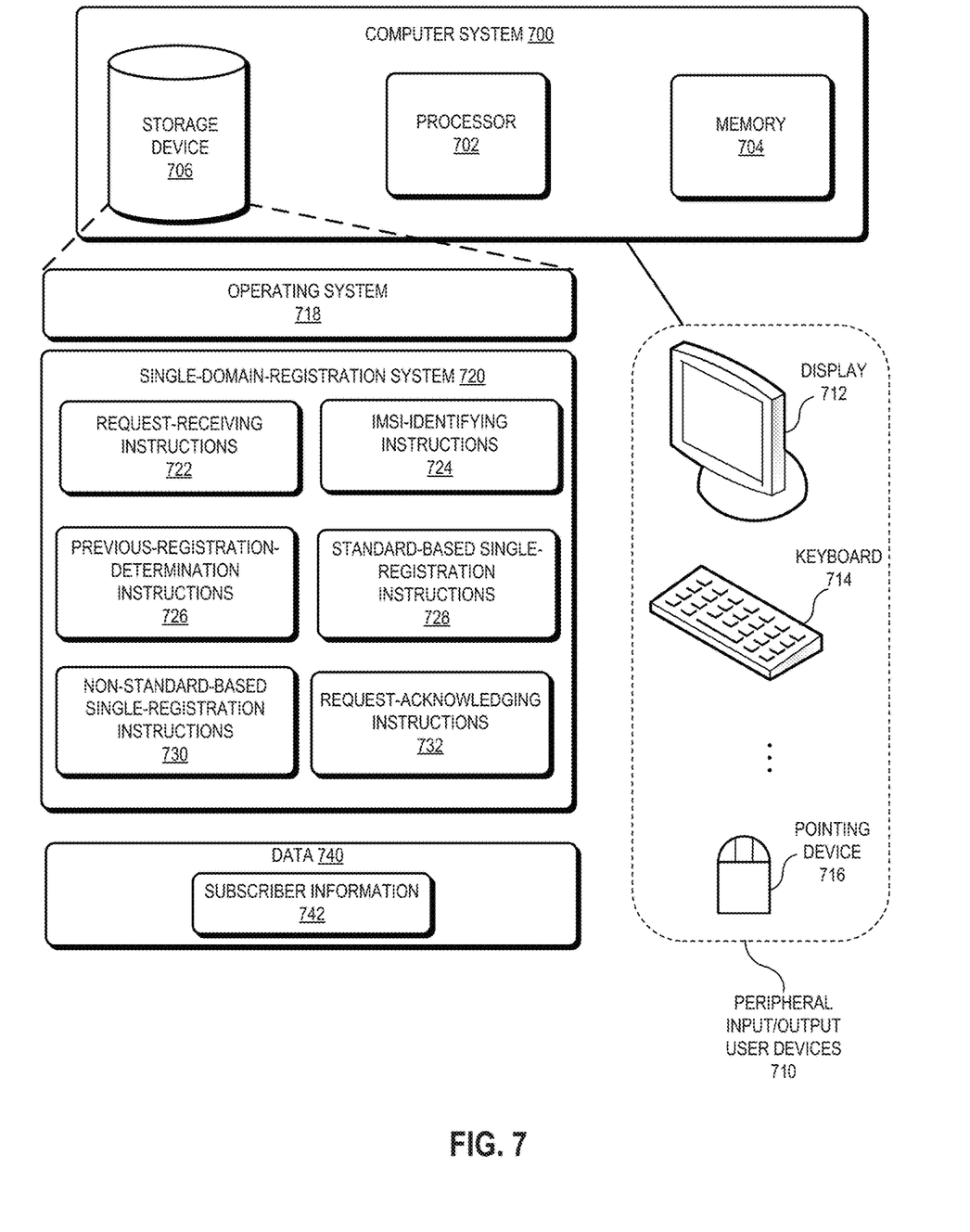
FIG. 7 illustrates an exemplary computer system that facilitates single-domain registration of UEs, according to one aspect of the application.

FIG. 7 illustrates an exemplary computer system that facilitates single-domain registration of UEs, according to one aspect of the application. Computer system 700 includes a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 718, a single-domain-registration system 720, and data 740. According to some aspects, computer system 700 can be part of an SME, which can communicate with different types of network nodes via different interfaces.

Single-domain-registration system 720 can include instructions, which when executed by computer system 700, can cause computer system 700 or processor 702 to perform methods and/or processes described in this disclosure. Specifically, single-domain-registration system 720 can include instructions for receiving a location-update request from a network node for a UE (request-receiving instructions 722), instructions for identifying IMSIs associated with the UE (IMSI-identifying instructions 724), instructions for determining a previous registration associated with the UE (previous-registration-determination instructions 726), instructions for enforcing standard-based single registration (standard-based single-registration instructions 728), instructions for generating and sending location-cancellation messages to enforce non-standard-based single-domain registration (non-standard-based single-domain-registration instructions 730), and instructions for registering the UE responsive to the location-update request by generating and sending an acknowledgment message (UE-registration instructions 732). Data 740 can include subscription data 742.

In general, this disclosure provides a solution to the problem of ensuring single-domain registration of a mobile device when the mobile device roams across multiple networks (e.g., networks of different providers and implementing different protocols). The proposed solution allows for unconditional cancellation of previous registrations of a mobile device when the mobile device roams across the boundary of different providers' networks, especially when the mobile device switches IMSIs (e.g., the mobile device may register for service using a MIMM IMSI when roaming). When the single-domain-registration feature for a particular mobile device is turned on, in response to receiving a location-update message via a first type of interface (e.g., the Gr interface), the SME may send a location-cancellation message via a second type of interface (e.g., the S6a interface) to a corresponding network node to cancel the previous registration (e.g., the S6a registration) of the mobile device at the network node. In addition to allowing for an incoming Gr registration to cause the cancellation of a previous S6a registration, the disclosed solution can also be applied in situations where an incoming S6a registration can cause the cancellation of a previous Gr or S6d registration and an incoming S6d registration can cause the cancellation of a previous S6a registration. Note that the messages used for cancelling the previous registration can include standard-based messages, such as messages based on the MAP or Diameter protocols. No modification to the service nodes (e.g., the MME, the S4-SGSN, or the Gn/Gp SGSN) is needed to implement the proposed solution.

One aspect can describe a system and method for managing registration of a user equipment (UE) roaming across different provider networks. During operation, the system can receive, at a subscriber-management entity (SME) from a first service node within a first provider's network, a location-update message associated with the UE. The system can identify a second service node within a second provider's network with which the UE has a previous registration and query a subscriber-information database to determine whether a single-domain-registration feature is enabled at the SME for the UE. In response to determining that the single-domain-registration feature is enabled, the system can send a location-cancellation message to the second service node to cause the second service node to cancel the previous registration of the UE and register the UE at the SME.

In a variation on this aspect, the first provider's network can include a second-generation (2G) or a third-generation (3G) network, the first service node can include a Gn/Gp Serving GPRS (General Packet Radio Service) Service Node (SGSN) communicating with the SME via a Gr interface, the location-update message can include an update-GPRS-location (UGL) message complying with a Mobile Application Part (MAP) protocol, and registering the UE can include completing a Gr registration.

In a further variation, the second provider's network can include a fourth generation (4G) network, the second service node can include a Mobile Management Entity (MME) communicating with the SME via an S6a interface, the location-cancellation message can include a cancel-location-request (CLR) message complying with a Diameter protocol, and the previous registration can be an S6a registration.

In a variation on this aspect, the first provider's network can include a 4G network, the first service node can include an MME communicating with the SME via an S6a interface, the location-update request can include an update-location-request (ULR) message complying with a Diameter protocol, and registering the UE can include completing an S6a registration.

In a further variation, the second provider's network can include a 2G or a 3G network, the second service node can include a Gn/Gp SGSN communicating with the SME via a Gr interface, the location-cancellation message can include a cancel-location (CL) message complying with a Mobile Application Part (MAP) protocol, and the previous registration can be a Gr registration.

In a variation on this aspect, the first provider's network can include a 4G network, the first service node can include an S4-SGSN communicating with the SME via an S6d interface, the location-update message can include an update-location-request (ULR) message complying with a Diameter protocol, and registering the UE can include completing an S6d registration.

In a further variation, the second provider's network can include a 4G network, the second service node can include a Mobile Management Entity (MME) communicating with the SME via an S6a interface, the location-cancellation message can include a cancel-location-request (CLR) message complying with a Diameter protocol, and the previous registration can be an S6a registration.

In a variation on this aspect, the location-update message can specify an International Mobile Subscriber Identity (IMSI) associated with the UE, and identifying the second service node can include identifying a different IMSI used by the UE to register with the second service node.

In a further variation, identifying the different IMSI can include querying the subscriber-information database.

In a variation on this aspect, the system can further determine whether the location-update message carries a predetermined standard-based flag indicating that single-registration is requested. In response to the location-update message carrying the predetermined standard-based flag, the system can perform a standard-based cancellation operation to cancel the previous registration of the UE.

One aspect can describe a subscriber-management entity (SME) for managing registration of a user equipment (UE) roaming across different networks associated with different providers. The SME can include a plurality of interfaces to communicate with a plurality of service nodes in the different networks, a first interface of the plurality of interfaces to receive from a first service node within a first provider's network, a location-update message associated with the UE. The SME can include a previous-registration-identifying unit to identify a second service node within a second provider's network with which the UE has a previous registration and a subscriber-information database to store subscriber information that indicates whether the single-domain-registration feature is enabled at the SME for the UE. The SME can include a single-domain-registration unit to send a location-cancellation message to the second service node via a second interface to cause the second service node to cancel the previous registration of the UE, in response to determining that the single-domain-registration feature is enabled at the SME for the UE. The SME can include a UE-registration unit to register the UE at the SME as being attached to the first service node.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-implemented method for managing registration of a user equipment (UE) roaming across different provider networks, the method comprising:
    receiving, at a subscriber-management entity (SME) from a first service node within a first provider's network, a location-update message associated with the UE, the location-update message specifying a first International Mobile Subscriber Identity (IMSI);
    identifying a second service node within a second provider's network with which the UE has a previous registration, the previous registration made with a second IMSI different from the first IMSI;
    querying a subscriber-information database to determine whether a single-domain-registration feature is enabled at the SME for the UE;
    in response to determining that the single-domain-registration feature is enabled, sending a location-cancellation message to the second service node to cause the second service node to cancel the previous registration made with the second IMSI of the UE; and
    registering the UE at the SME.

2. The method of claim 1,
    wherein the first provider's network comprises a second-generation (2G) or a third-generation (3G) network;
    wherein the first service node comprises a Gn/Gp Serving GPRS (General Packet Radio Service) Service Node (SGSN) communicating with the SME via a Gr interface;
    wherein the location-update message comprises an update-GPRS-location (UGL) message complying with a Mobile Application Part (MAP) protocol; and
    wherein registering the UE comprises completing a Gr registration.

3. The method of claim 2,
    wherein the second provider's network comprises a fourth generation (4G) network;
    wherein the second service node comprises a Mobile Management Entity (MME) communicating with the SME via an S6a interface;
    wherein the location-cancellation message comprises a cancel-location-request (CLR) message complying with a Diameter protocol; and
    wherein the previous registration is an S6a registration.

4. The method of claim 1,
    wherein the first provider's network comprises a 4G network, wherein the first service node comprises an MME communicating with the SME via an S6a interface;
    wherein the location-update request comprises an update-location-request (ULR) message complying with a Diameter protocol; and
    wherein registering the UE comprises completing an S6a registration.

5. The method of claim 4,
    wherein the second provider's network comprises a 2G or a 3G network, wherein the second service node comprises a Gn/Gp SGSN communicating with the SME via a Gr interface;
    wherein the location-cancellation message comprises a cancel-location (CL) message complying with a Mobile Application Part (MAP) protocol; and
    wherein the previous registration is a Gr registration.

6. The method of claim 1,
    wherein the first provider's network comprises a 4G network, wherein the first service node comprises an S4-SGSN communicating with the SME via an S6d interface;
    wherein the location-update message comprises an update-location-request (ULR) message complying with a Diameter protocol; and
    wherein registering the UE comprises completing an S6d registration.

7. The method of claim 6,
    wherein the second provider's network comprises a 4G network, wherein the second service node comprises a Mobile Management Entity (MME) communicating with the SME via an S6a interface;
    wherein the location-cancellation message comprises a cancel-location-request (CLR) message complying with a Diameter protocol; and
    wherein the previous registration is an S6a registration.

8. The method of claim 1, further comprising:
    determining whether the location-update message carries a predetermined standard-based flag indicating that single-registration is requested; and
    in response to the location-update message carrying the predetermined standard-based flag, performing a standard-based cancellation operation to cancel the previous registration of the UE.

9. A subscriber-management entity (SME) for managing registration of a user equipment (UE) roaming across different networks associated with different providers, the SME comprising:
    a processing resource; and
    a non-transitory machine-readable storage medium comprising instructions executable by the processing resource to:
    receive, from a first service node within a first provider's network, a location-update message associated with the UE, the location-update message specifying a first International Mobile Subscriber Identity (IMSI);
    identify a second service node within a second provider's network with which the UE has a previous registration, the previous registration made with a second IMSI different from the first IMSI;
    query a subscriber-information database to determine whether a single-domain-registration feature is enabled at the SME for the UE;
    send a location-cancellation message to the second service node to cause the second service node to cancel the previous registration of the UE made with the second IMSI, in response to determining that the single-domain-registration feature is enabled at the SME for the UE; and
    register the UE at the SME as being attached to the first service node.

10. The SME of claim 9,
    wherein the first provider's network comprises a second-generation (2G) or a third-generation (3G) network, wherein the first service node comprises a Gn/Gp Serving GPRS (General Packet Radio Service) Service Node (SGSN);
    wherein the first interface comprises a Gr interface; and
    wherein the location-update message comprises an update-GPRS-location (UGL) message complying with a Mobile Application Part (MAP) protocol.

11. The SME of claim 10,
    wherein the second provider's network comprises a fourth generation (4G) network;

wherein the second service node comprises a Mobile Management Entity (MME);

wherein the second interface comprises an S6a interface; and wherein the location-cancellation message comprises a cancel-location-request (CLR) message complying with a Diameter protocol.

12. The SME of claim 9, wherein the first provider's network comprises a 4G network, wherein the first service node comprises an MME;

wherein the first interface comprises an S6a interface; and wherein the location-update request comprises an update-location-request (ULR) message complying with a Diameter protocol.

13. The SME of claim 12, wherein the second provider's network comprises a 2G or a 3G network, wherein the second service node comprises a Gn/Gp SGSN;

wherein the second interface comprises a Gr interface; and wherein the location-cancellation message comprises a cancel-location (CL) message complying with a Mobile Application Part (MAP) protocol.

14. The SME of claim 9, wherein the first provider's network comprises a 4G network;

wherein the first service node comprises an S4-SGSN;

wherein the first interface comprises an S6d interface; and wherein the location-update message comprises an update-location-request (ULR) message complying with a Diameter protocol.

15. The SME of claim 14, wherein the second provider's network comprises a 4G network;

wherein the second service node comprises a Mobile Management Entity (MME);

wherein the second interface comprises an S6a interface; and wherein the location-cancellation message comprises a cancel-location-request (CLR) message complying with a Diameter protocol.

16. The SME of claim 9, wherein the single-domain-registration unit is to:

determine whether the location-update message carries a predetermined standard-based flag indicating that single-registration is requested; and in response to the location-update message carrying the predetermined standard-based flag, performing a standard-based cancellation operation to cancel the previous registration of the UE.

17. A non-transitory computer-readable medium storing instructions to:

receive, at a subscriber-management entity (SME) from a first service node within a first provider's network, a location-update message associated with a user equipment (UE) roaming across different provider networks, the location-update message specifying a first International Mobile Subscriber Identity (IMSI);

identify a second service node within a second provider's network with which the UE has a previous registration, the previous registration made with a second IMSI different from the first IMSI;

query a subscriber-information database to determine whether a single-domain-registration feature is enabled at the SME for the UE;

in response to determining that the single-domain-registration feature is enabled, send a location-cancellation message to the second service node to cause the second service node to cancel the previous registration made with the second IMSI of the UE; and register the UE at the SME.

* * * * *